United States Patent Office 3,269,979
Patented August 30, 1966

3,269,979
WEATHERING RESISTANT THERMOPLASTIC
POLYHYDROXYETHER
Robert H. Snedeker, New Brunswick, N.J., assignor to
Union Carbide Corporation, a corporation of New
York
No Drawing. Filed Dec. 4, 1962, Ser. No. 242,108
7 Claims. (Cl. 260—45.85)

This invention relates to weathering resistant thermoplastic polyhydroxyether compositions.

Polyhydroxyethers are high molecular weight, stable thermoplastic polymers which can be thermoformed or formed from powder or solution or otherwise into various useful contours such as film, sheets, molded articles and the like. Films of thermoplastic polyhydroxyether are of special interest since they are flexible clear and colorless, and have good oxygen and water vapor barrier properties. Articles molded of polyhydroxyethers are strong and tough and exhibit high values in tensile modulus, tensile strength, elongation and pendulum impact.

In many applications for thermoplastic polyhydroxyether, resistance to weathering, i.e. degradation generally manifested by yellowing on exposure to actual or simulated outdoor environments where the structure is subjected to sunlight and rain or their equivalent is of great importance.

It is an object, therefore, of the present invention to provide thermoplastic polyhydroxyether compositions having improved resistance to weathering.

It has now been discovered that thermoplastic compositions comprising thermoplastic polyhydroxyether and both an hydroxy-alkoxy benzophenone and at least one member selected from the group consisting of phenanthrene, calcium ethyl acetoacetate acetate

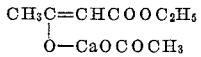

di-t-butyl-p-cresol, bis(2-hydroxy-3-t-butyl-5-ethylphenyl) methane, dilauryl thiodipropionate, trialkyl phosphites and dialkyl monoaryl phosphites are improved in weathering resistance i.e. are resistant to yellowing upon exposure to actual or simulated outdoor environments.

The term "thermoplastic polyhydroxyether" herein refers to substantially linear polymers having the general formula

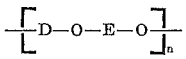

wherein D is the radical residium of a dihydric phenol, E is an hydroxyl containing radical residium of an epoxide, and $n$ represents the degree of polymerization and is at least 30 and is preferably 80 or more. The term "thermoplastic polyhydroxyether" is intended to include mixtures of at least two thermoplastic polyhydroxyethers.

The dihydric phenol contributing the phenol radical residuum, D, can be either a dihydric mononuclear phenol such as hydroquinone and resorcinol or a dihydric polynuclear phenol such as those having the general formula

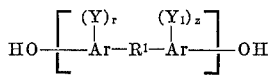

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms i.e. fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

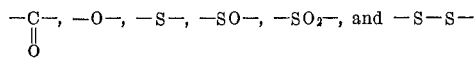

and divalent hydrocarbon radicals such as alkylene, alkylidene, cycloaliphatic e.g. cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include, among others:

The bis-(hydroxyphenyl)-alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorphenyl)ethane,
1,1-bis-(3-methyl-4-hydroxyphenyl)ethane,
1,3-bis(3-methyl-4-hydroxyphenyl)propane,
2,2-bis(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
bis-(4-hydroxyphenyl)cyclohexylmethane,
1,2-bis-(4-hydroxyphenyl)-1,2-bis-(phenyl)-propane,
2,2-bis-(4-hydroxyphenyl)-1-phenyl-propane
and the like;

Di(hydroxyphenyl)sulfones such as bis-(4-hydroxy-phenyl)sulfone,
2,4'-dihydroxydiphenyl sulfone,
5'-chloro-2,4'-dihydroxydiphenyl sulfone,
5'-chloro-4,4'-dihydroxydiphenyl sulfone
and the like;

Di(hydroxyphenyl)ethers such as bis-(4-hydroxyphenyl)-ether,
the 4,3'-, 4,2'-, 2,2'-, 2,3'-, dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxydiphenyl ether,
4,4'-dihydroxy-2,5-diethoxydiphenyl ether,
and the like.

Also suitable are the bisphenol reaction products of 4-vinyl-cyclohexene and phenols, e.g. 1,3-bis(p-hydroxyphenyl)-1-ethylcyclohexane, and the bisphenol reaction products of dipentene or its isomers and phenols such as 1,2 - bis(p-hydroxyphenyl) - 1-methyl-4-isopropylcyclohexane as well as bisphenols such as 1,3,3-trimethyl-1-(4- hydroxyphenyl)-6-hydroxyindane, and 2,4-bis(4-hydroxyphenyl)-4-methylpentane, and the like.

Particularly desirable dihydric polynuclear phenols have the formula

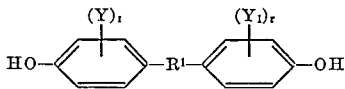

wherein Y and $Y_1$ are as previously defined $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 9 carbon atoms.

Mixtures of dihydric phenols can also be employed and whenever the term "dihydric phenol" or "dihydric polynuclear phenol" is used herein mixtures of these compounds are intended to be included.

The epoxide contributing the hydroxyl containing radical residuum, E, can be a monoepoxide or diepoxide. By "epoxide" is meant a compound containing an oxirane group i.e. oxygen bonded to two vicinal aliphatic carbon atoms, thus,

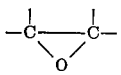

A monoepoxide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenic unsaturation i.e. $>C=C<$ and acetylenic unsaturation, i.e. $-C \equiv C-$, are preferred. Particularly preferred are halogen substituted saturated monoepoxides i.e. the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate),
bis(3,4-epoxycyclohexylmethyl)adipate,
bis(3-,4-epoxycyclohexylmethyl)phthalate,
6-methyl-3,4-epoxycyclohexylmehtyl 6-methyl-3,4-epoxycyclohexane carboxylate,
2-chloro-3,4-epoxycyclohexylmethyl 2-chloro-3,4-epoxycyclohexanecarboxylate,
diglycidyl ether,
bis(2,3-epoxycyclopentyl)ether,
1,5-pentanediol bis(6-methyl-3,4-epoxycyclohexylmethyl)ether,
bis(2,3-epoxy-2-ethylhexyl)adipate,
diglycidyl maleate,
diglycidyl phthalate,
3-oxatetracyclo [$4 \cdot 4 \cdot 0 \cdot 1^{7,10} \cdot 0^{2,4}$] undec 8-yl-2,3 epoxypropyl ether,
[$4 \cdot 4 \cdot 0 \cdot 1^{7,10} \cdot 0^{2,4}$] undec -8-yl 2,3 epoxypropyl ether,
bis(2,3 epoxycyclopentyl)sulfone,
bis(3,4-epoxyhexoxypropyl)sulfone,
2,2'-sulfonyldiethyl bis(2,3-epoxycyclopentanecarboxylate),
3-oxatetracyclo [$4 \cdot 4 \cdot 0 \cdot 1^{7,10} \cdot 0^{2,4}$] undec -8- yl 2,3 epoxybutyrate,
4-pentenal-di(6-methyl-3,4-epoxycyclohexylmethyl) acetal,
ethylene glycol bis(9,10-epoxystearate),
diglycidyl carbonate,
bis(2,3-epoxybutylphenyl)2-ethylhexyl phosphate,
diepoxydioxane,
butadiene dioxide and
2,3-dimethyl dioxide The preferred diepoxides are those wherein each of the oxirane groups is connected to an electron donating substituent which is not immediately connected to the carbon atoms of that oxirane group.

Such diepoxides have the grouping

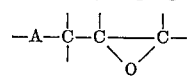

wherein A is an electron donating substituent such as

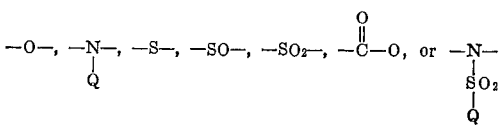

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

The thermoplastic polyhydroxyether compositions of this invention can be prepared by any of the blending or mixing means conventionally used to mix or compound thermoplastics. For example, suitable techniques include codissolving and blending of solutions of the components, working in a Banbury mixer, a compounding extruder, or on a roll mill or in equivalent apparatus. Fluxing the composition components during a portion of the mixing in these apparatus is preferred to insure homogeneity of the final composition.

The invention is illustrated by the following examples wherein all parts and percentages are by weight. Melt flow of the thermoplastic polyhydroxyether was determined by weighing in grams of the amount of polyhydroxyether which, at a temperature of 220° C. and under a pressure of 44 p.s.i., flowed through an orifice having a diameter of 0.0825" and a length of 0.315" over a ten minute period. Four such determinations were made and the average of the four determinations is reported as decigrams per minute under a pressure of 44 p.s.i. and at 220° C.

All compositions were prepared by fluxing the components in a Banbury mixer at a temperature of about 120–160° C. The material was then sheeted and a portion placed in a compression mold and molded into 0.020" thick plaques.

PREPARATION OF THE THERMOPLASTIC POLYHYDROXYETHER

The thermoplastic polyhydroxyether used was prepared by the reaction of equimolar amounts of 2,2-bis(4-hydroxyphenyl) propane and epichlorohydrin together with sodium hydroxide. The reactor equipment used was provided with a sealed stirrer, thermometer, and reflux condenser. There was placed in the reactor

| | Parts |
|---|---|
| 2,2-bis(4-hydroxyphenyl) propane | 114.5 |
| Epichlorohydrin (99.1%) pure | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added. Heating of the mixture at 80° C. was continued another two hours. There was added to the reactor an additional 50 parts of the 7:3 toluene:butanol mixture and 4.5 parts of phenol. The contents of the reactor were continued heated at 80° C. (reflux) for 2½ hours. Upon cooling, the reaction mixture was cut with 200 parts of the 7:3 toluene:butanol mixture. One hundred parts of water was added to the reactor and agitated with the contents to dissolve salts present in the reaction mixture. A lower brine phase was separated by decantation. The upper polymer solution containing phase was washed successively with two 160 part portions of water containing 4.5% butanol. The washed polymer solution was acidified by stirring the solution with a mixture of 1 part of 85% phosphoric acid with 100 parts of (pH=2) for one hour. The upper polymer solution phase was again separated by decantation and water washed with four successive 200 part portions of water containing 4.5% butanol. The washed polymer was then coagulated in 1000 parts of isopropanol, filtered, and dried. There was obtained a thermoplastic polyhydroxyether of 2,2-bis(4-hydroxyphenyl)propane and epichlorohydrin having a melt flow of 3.3 decigrams per minute.

Another polyhydroxyether was similarly prepared which had a melt flow of 0.9 decigram per minute.

Melt flow of the polyhydroxyether is not at all critical in the instant invention with all normally solid polyhydroxyethers being improved by the addition of the above mentioned materials.

In each of the following examples weathering was carried out by exposing the plaques in an Atlas XW Weatherometer and inspecting at 250 hour intervals. Unacceptable yellowing is reported as "yellowing." Sufficient results reported have been confirmed by outdoor weathering in Florida, U.S.A. to prove the reliability of the weatherometer data.

Example 1

One part of 2-hydroxy-4-methoxy-benzophenone and 0.2 part of calcium ethyl acetoacetate acetate were incorporated into the 3.3 melt flow thermoplastic polyhydroxyether. Yellowing was noted after 2000 hours.

*Control.*—Polyhydroxyether (melt flow 0.9) without any additive yellowed in less than 250 hours.

*Control IA.*—Example 1 was duplicated but without adding the 2-hydroxy-4-methoxybenzophenone. Yellowing occurred after only 500 hours.

*Control IB.*—Example 1 was duplicated but without adding the calcium ethyl acetoacetate acetate and using the 0.9 melt flow thermoplastic polyhydroxyether. Yellowing occurred after between 750 and 1000 hours.

It is thus apparent that the yellowing resistance imparted to thermoplastic polyhydroxy ether by the combination of 2-hydroxy-4-methoxybenzophenone and calcium etheyl acetoacetate acetate is synergistic in nature.

Example 2

One part of 2-hydroxy-4-methoxybenzophenone and 0.2 part of di-t-butyl-p-cresol were incorporated into the 3.3 melt flow thermoplastic polyhydroxyether. Yellowing was noted only after 1750 hours.

*Control II.*—Example 2 was duplicated but without adding the 2-hydroxy-4-octoxybenzophenone. Less than 250 hours of protection against weathering was obtained.

Example 3

One part of 2,2'-dihydroxy-4-octoxybenzophenone and 0.2 part of calcium ethyl acetoacetate acetate is incorporated into the 3.3 melt flow thermoplastic polyhydroxyether. Yellowing is noted only after 2000 hours.

*Control III.*—Example 3 was duplicated but without adding calcium ethyl acetoacetate acetate. Yellowing was retarded for only 1000 hours.

Again by comparing Example 3, Control III and Control IA the synergistic effect in weathering resistance improvement is shown.

Examples 4–10

Additional examples were run using various other compounds with 2-hydroxy-4-octoxybenzophenone or 2-hydroxy-4-methoxybenzophenone. Data on these examples and Examples 1–3 are summarized in the table.

TABLE

| Example | Polyhydroxyether (MF=3.3) plus— | Percent | Hours to Yellowing |
|---|---|---|---|
| Control [1] | | | >250 |
| Example 1 | 2-hydroxy-4-methoxybenzophenone | 1.0 | |
| | plus | | |
| | Calcium ethyl acetoacetate acetate | 0.2 | 2,000 |
| Control IA | Calcium ethyl acetoacetate acetate | 0.2 | 500 |
| Control IB [1] | 2-hydroxy-4-methoxybenzophenone | 1.0 | >750 |
| Example 2 | 2-hydroxy-4-methoxybenzophenone | 1.0 | |
| | plus | | |
| | Di-t-butyl-p-cresol | 0.2 | 1,750 |
| Control II | Di-butyl-p-cresol | 0.2 | >250 |
| Example 3 | 2,2'-dihydroxy-4-octoxybenzophenone | 1.0 | |
| | plus | | |
| | Calcium ethyl acetoacetate acetate | 0.2 | 2,000 |
| Control III [1] | 2,2'-dihydroxy-4-octoxybenzophenone | 1.0 | 1,000 |
| Example 4 | 2-hydroxy-4-octoxybenzophenone | 1.0 | |
| | plus | | |
| | Di-t-butyl-p-cresol | 0.2 | 1,750 |
| Control IV [1] | 2-hydroxy-4-octoxybenzophenone | 1.0 | 750 |
| Example 6 | 2-hydroxy-4-methoxybenzophenone | 1.0 | |
| | plus | | |
| | Phenanthrene | 0.2 | 2,000 |
| Control VI | Phenanthrene | 0.2 | <250 |
| Example 7 | 2-hydroxy-4-methoxybenzophenone | 1.0 | |
| | plus | | |
| | Bis(2-hydroxy-3-t-butyl-5-ethylphenyl)methane | 0.2 | >1,000 |
| Example 8 | 2-hydroxy-4-methoxybenzophenone | 1.0 | |
| | plus | | |
| | Dilauryl dithiopropionate | 0.2 | >1,000 |
| Example 9 | 2-hydroxy-4-methoxybenzophenone | 1.0 | |
| | plus | | |
| | Tridecyl phosphite [2] | 0.2 | >1,000 |
| Example 10 | 2-hydroxy-4-methoxybenzophenone | 1.0 | |
| | plus | | |
| | 2-ethylhexyl octyl phenyl phosphite [2] | 0.5 | >1,000 |

[1] MF of polyhydroxyether was 0.9.
[2] Other alkyl substituents can have from 1 to 10 carbon atoms.

Example 11

Example 1 was duplicated but using a 2 mil self-supporting film of a thermoplastic polyhydroxyether. Weathering resistance was similarly improved.

As indicated the hydroxy-alkoxy substituted benzophenones are effective in conjunction with a variety of materials. Preferred hydroxy-alkoxy benzophenones are those containing alkoxy groups having from 1 to 10 carbon atoms. Particularly preferred of these benzophenones are those wherein the hydroxy and alkoxy substituents are meta one to the other, especially those wherein these substituents are ortho and para respectively to the ring carbon atom bonded to the carbonyl group. Benzophenones having one alkoxy substituents and from one to two hydroxy substituents, with the proviso that where there are two they are on different aromatic rings on highly preferred species.

Other compounds and combination of compounds have been found to be less effective in preventing yellowing of thermoplastic polyhydroxyether on weathering. There can be mentioned:

monobenzoyl resorcinol,
tribenzoyl resorcinol,
phenyl salicylate,
t-butylphenyl salicylate,
dibenzoyl resorcinol,
zinc diethyldithiocarbamate and 2-hydroxy-4-methoxybenzophenone,
substituted acrylonitrile,
2-hydroxy-4-methoxybenzophenone,
tridecyl phosphite and tin alkyl mercaptide,
dibenzoyl resorcinol and tri-decyl phosphite,
dibenzoyl resorcinol di-t-butyl-p-cresol,
hexamethyl phosphoric triamide,
2-hydroxy-4-methoxybenzophenone and tetra cresol,
ethylenediamine tetraacetic acid,
disodium ethylenediamine tetraacetate dihydrate,
nickel salt of disodium ethylenediamine tetraacetate dihydrate,
calcium salt of disodium ethylenediamine tetraacetate dihydrate,
dibenzoyl resorcinol and citric acid,
2-hydroxy-4-methoxybenzophenone and zinc diisopropyldithiophosphate,
t-butylphenyl salicylate and zinc diethyldithiocarbamate,
p-octylphenyl salicylate, hydroxychlorobenzophenone, zinc diethyldithiocarbamate,
tricresyl phosphate, tellurium diethyldithiocarbamate,
zinc mercaptobenzothiazole,
dipentamethylene thiuramtetrasulfide,
p-phenylphenol,
hydroxychlorobenzophenone and zinc diethyldithiocarbamate,
t-butylphenyl salicylate and tellurium diethyldithiocarbamate,
hydroxychlorobenzophenone and tellurium diethyldithiocarbamate,
oxamide and copper salt of disodium ethylene diamine tetraacetate dihydrate.

The compositions of the present invention can contain in the usual amounts, conventional additives, e.g. fillers, extenders, opacifiers, modifiers and stabilizers.

The amount of yellowing retarding materials used is not critical provided an effective amount is employed. Generally from 0.2 to 5 preferably 0.75 to 1.5 parts by weight of the hydroxy-alkoxy benzophenone is sufficient used with from 0.001 to 3, preferably from 0.001 to 0.3 part by weight of the other additive, all parts being based on the thermoplastic polyhydroxyether.

What is claimed is:

1. Thermoplastic polyhydroxyether composition exhibiting improved resistance to yellowing by weathering and comprising thermoplastic polyhydroxyether having the general formula:

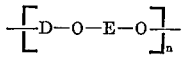

wherein D is the radical residuum of a dihydric phenol, E is an hydroxyl containing radical residuum of an epoxide, and $n$ represents the degree of polymerization and is at least 30, and a small but effective amount, sufficient to retard yellowing by weathering, of the combination of a 2-hydroxy-4-alkoxybenzophenone and at least one member selected from the group consisting of calcium ethyl acetoacetate acetate, phenanthrene, dilauryl thiodipropionate, di-t-butyl-p-cresol, bis(2-hydroxy-3-t-butyl-5-ethylphenyl)methane, trialkyl phosphites and dialkyl monoaryl phosphites.

2. Composition claimed in claim 1 wherein the 2-hydroxy-4-alkoxybenzophenone alkoxy groups contain 1 to 10 carbon atoms, inclusive and there is employed therewith calcium ethyl acetoacetate acetate.

3. Composition claimed in claim 1 wherein the 2-hydroxy-4-alkoxybenzophenone alkoxy groups contain 1 to 10 carbon atoms, inclusive and there is employed therewith phenanthrene.

4. Composition claimed in claim 1 wherein the 2-hydroxy-4-alkoxybenzophenone alkoxy groups contain 1 to 10 carbon atoms, inclusive and there is employed therewith di-t-butyl-p-cresol.

5. Composition claimed in claim 1 wherein the 2-hydroxy-4-alkoxybenzophenone alkoxy groups contain 1 to 10 carbon atoms, inclusive and there is employed therewith bis(2-hydroxy-3-t-butyl-5-ethylphenyl)methane.

6. Composition claimed in claim 1 wherein the 2-hydroxy-4-alkoxybenzophenone alkoxy groups contain 1 to 10 carbon atoms, inclusive and there is employed therewith trialkyl phosphites.

7. Composition claimed in claim 1 wherein the 2-hydroxy-4-alkoxybenzophenone alkoxy groups contain 1 to 10 carbon atoms, inclusive and there is employed therewith dialkyl monoaryl phosphites.

References Cited by the Examiner
UNITED STATES PATENTS

| | | | |
|---|---|---|---|
| 2,669,549 | 2/1954 | Darby | 260—45.95 |
| 2,951,052 | 8/1960 | Darby | 260—45.75 |
| 2,976,259 | 3/1961 | Hardy et al. | 260—45.95 |
| 2,976,260 | 3/1961 | Newland et al. | 260—45.95 |
| 3,000,857 | 9/1961 | Craven | 260—45.95 |

LEON J. BERCOVITZ, *Primary Examiner.*

DONALD E. CZAJA, *Examiner.*

M. J. WELSH, *Assistant Examiner.*